United States Patent [19]

Binger et al.

[11] 4,020,992

[45] May 3, 1977

[54] SEPARATION OF JOINED PLASTIC AND METAL COMPONENTS

[75] Inventors: Wayne W. Binger, New Kensington; John W. Collins, III, Leechburg; Melvin R. Fahnestock, Apollo; George H. Stuppy, Atglen, all of Pa.

[73] Assignee: Aluminum Company of America, Pittsburgh, Pa.

[22] Filed: Nov. 20, 1975

[21] Appl. No.: 633,680

[52] U.S. Cl. .................... 241/18; 241/DIG. 37; 241/DIG. 38; 241/65
[51] Int. Cl.[2] .............................. B02C 23/18
[58] Field of Search ............ 241/DIG. 37, DIG. 38, 241/65, 18, 23

[56] References Cited

UNITED STATES PATENTS

| 2,879,005 | 3/1959 | Jarvis | 241/DIG. 37 |
| 3,527,414 | 9/1970 | Schorsch | 241/DIG. 37 |
| 3,666,185 | 5/1972 | Williams | 241/DIG. 37 |
| 3,848,813 | 11/1974 | Stanczyk et al. | 241/DIG. 38 |

Primary Examiner—Granville Y. Custer, Jr.
Attorney, Agent, or Firm—David W. Brownlee

[57] ABSTRACT

A method and apparatus for separating plastic liners from metal closures is disclosed which includes a liquid nitrogen precooler for chilling closures with liners therein, a hammermill for impacting the chilled closures to liberate the liners from the closures, a tumble barrel for separating large pieces of closures from the plastic liners and the small pieces of closures, and a high-tension electrical separator for separating the small pieces of closures from the plastic liners.

4 Claims, 1 Drawing Figure

SEPARATION OF JOINED PLASTIC AND METAL COMPONENTS

BACKGROUND OF THE INVENTION

1. Field of Art

This invention relates to recycling scrap materials, and in particular relates to separation of metal and plastic components as in metal closures having plastic liners therein.

2. Brief Description of the Prior Art

Recycling scrap materials is becoming more and more important due to ecology problems caused by discarded scrap and energy and material shortages. Recycling scrap material removes the cause of the objectionable litter and scrap piles, and salvages valuable materials using a fraction of the energy required to produce such materials from their ores or other natural state.

Some scrap materials, such as bottle closures, include joined metal and plastic components which have substantial value for recycling. However, it has heretofore been difficult to separate the metal and plastic components without undue cost which makes recycling impractical. The metal and plastic parts are sometimes bonded together and are not readily separated by conventional means. Scrap which includes both metal and plastic such as polyvinyl chloride should not be remelted because the plastic will produce noxious gas such as chlorine.

Heretofore, separation of plastic and metal components has usually required grinding of the components. When the components are ground, metal fines are produced which cling to the plastic to contaminate the plastic and make it difficult if not impossible to reuse the plastic.

Accordingly, an improved technique is desired for separating metal and plastic components from recyclable material such as metal closures with plastic liners therein.

SUMMARY OF THE INVENTION

This invention provides a method and apparatus for separating joined plastic and metal components by chilling the components until the plastic becomes brittle, impacting the chilled components to liberate the plastic from the metal and separating the plastic components from the metal components. In a preferred embodiment of the invention, plastic liners are separated from metal closures by chilling the closures with liquid nitrogen to approximately −250° F, impacting the chilled closures in a hammermill to liberate the liners from the closures, separating the plastic liners and the small pieces of closure from the larger pieces of closures using a tumble barrel, and separating the small pieces of closures from the plastic liners using a high tension electrical separator.

An object of this invention is to provide a method and apparatus for separating joined plastic and metal components.

Another object of this invention is to provide a method and apparatus for separating plastic liners from metal closures in which the liners are trapped and/or bonded.

A further object of this invention is to provide a technique for chilling joined plastic and metal components to embrittle the plastic and thereafter liberate the plastic from the metal by agitating and impacting the joined components.

The above and other objects and advantages will be more fully understood and appreciated with reference to the following description and the drawing attached hereto.

DESCRIPTION OF A PREFERRED EMBODIMENT

Figure 1:
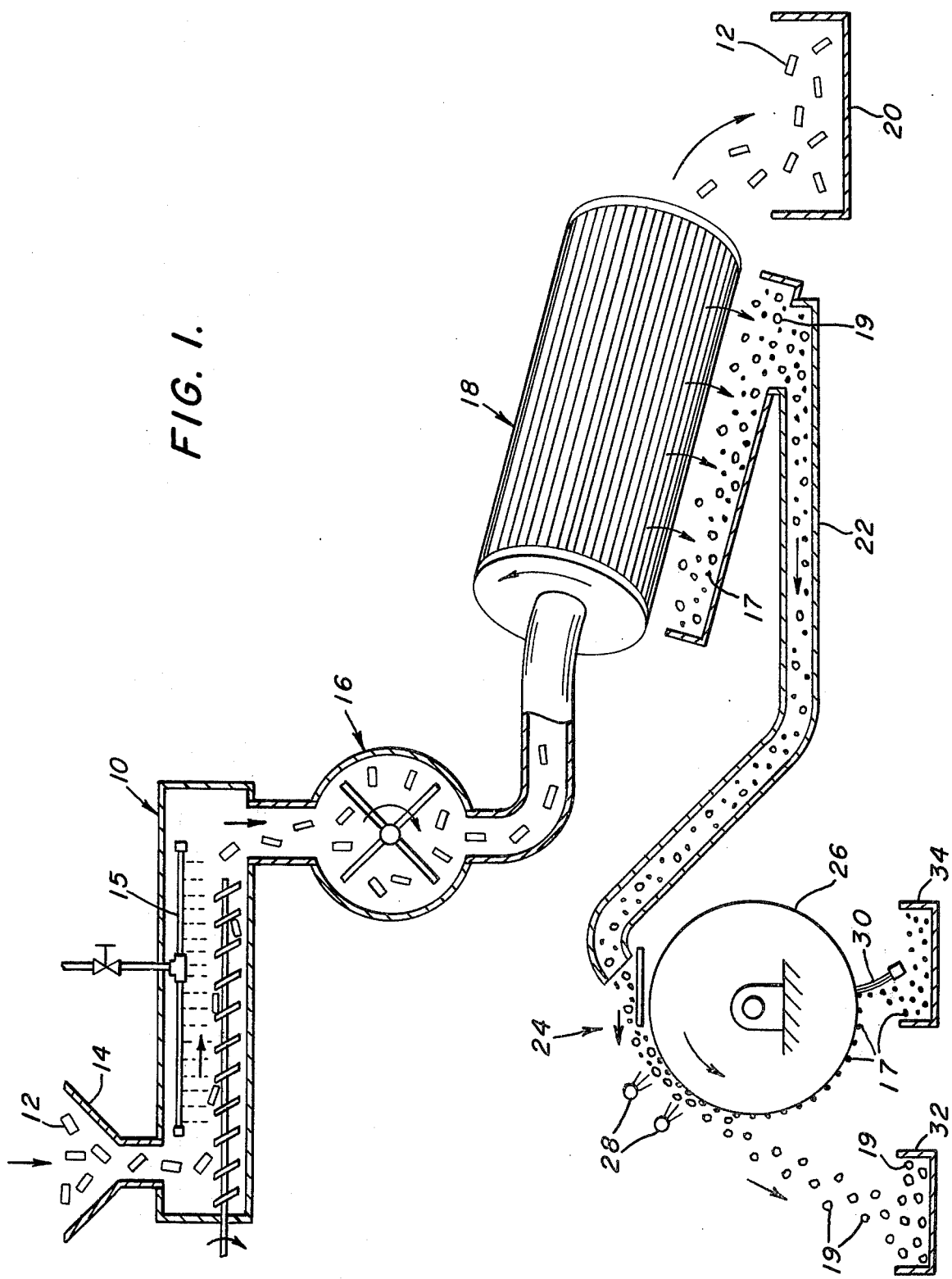
FIG. 1 illustrates a preferred embodiment of the apparatus of this invention for separating plastic liners from aluminum closures.

A preferred embodiment of the apparatus of this invention includes a precooler 10 into which aluminum closures 12 with plastic liners bonded therein are fed through a chute 14 to be cooled by liquid nitrogen which is sprayed into the precooler by a manifold 15. Precoolers of the type illustrated, are available from a number of sources such as Air Products and Chemical, Inc. of Allentown, Pennsylvania and Union Carbide Corporation of Tarrytown, New York. Depending on the plastic in the closures, they are preferably chilled to a temperature in the range of approximately −150° F to −250° F or until the plastic liners in the closures become brittle. To chill the closures and liners to the desired temperature may require approximately 0.3 pound to 1.0 pound of liquid nitrogen per pound of closure scrap.

From the precooler 10, the chilled closures and liners are fed into a hammermill 16 which agitates and impacts the closures and liners to liberate the brittle liners from the closures. The hammermill 16 preferably does not shred the closures into small pieces, but instead merely breaks the bond between the closures and liners with a minimum of damage to the closures so each closure remains in essentially one piece. Due to the brittle nature of the plastic liners, the agitation by the hammermill will break the plastic bond with the metal closure and liberate the liner from the closure, and may also shatter the liner into multiple pieces. Hammermills of the type used in this invention are available from a number of sources such as Micro Pulverizing Machinery Product Company among others.

From the hammermill 16, the separated aluminum closures and plastic liners are fed into a tumble barrel 18 which separates the plastic liners 17 and any small pieces 19 of the closures from the large pieces of closures 12. This separation may be done by screens, wires or rods in the barrel through which the small plastic and metal pieces 17 and 19 will pass while carrying the large pieces of closures 12 to an open end of the barrel where they are deposited in a container 20. Tumble barrels of the type used in this invention may be purchased from several sources such as Triple S Products Company of Houston, Texas.

From the tumble barrel 18, the small pieces of aluminum 19 and the plastic liners 17 are transferred via a conveyor 22 to a high tension electrical separator 24 for separation of the small pieces of aluminum 19 from the plastic liners 17. The separator 24 includes a ground separator rotor 26 and one or more electrodes 28 which discharge electricity to the materials carried on the rotor. The particles having a relatively poor conductively such as the plastic will assume an electrical charge and will be attracted and pinned to the rotor. The particles having a relatively high conductivity such as the pieces of aluminum quickly dissipate their assumed electrical charge to the grounded rotor. The particles of higher conductivity therefore, when leaving the rotor, follow a flight path approximately the same as they would follow if there were no charging effect at all. The particles having a poor conductivity which have been pinned to the rotor will follow the path of the rotor to be swept or scraped off the rotor by a scraper or brush 30. This results in the metal particles 19 being deposited in one container 32 and the non-metallic plastic particles 17 in a separate container 34. High tensions electrical separators of the type used in this invention are available from Carpco, Inc. of Jacksonville, Florida.

In a preferred embodiment of this invention, the apparatus for separating the plastic liners from the metallic closures is preferably closed against ambient air to avoid condensation of moisture on the chilled metal and plastic components. It has been found that condensed moisture on the components makes separation of the components more difficult. By closing the system, the nitrogen gas produced in the precooler will flow through the system with the closures and liners and effectively resist the ingress of ambient air into the system. The aluminum closures and plastic liners are also thereby maintained at a relatively low temperature throughout the system which helps to insure that they are dry and free from condensed moisture which makes separation difficult.

It is seen that this invention provides a method and apparatus for separating joined plastic and metal components which obviates any need to grind the components. When the components are ground into small particles as in the prior art techniques, metal fines are produced which cannot be readily separated from the plastic and therefore contaminate the scrap plastic so it cannot be reused. Cryogenic separation of plastic from metal as in this invention does not require grinding of the materials and therefore makes it possible to recycle the plastic as well as the metal.

Although a preferred embodiment of the invention has been selected for purposes of illustration and description, it will be appreciated by those skilled in the art that numerous variations can be made in such preferred embodiment without departing from the invention or the scope of the claims appended hereto.

What is claimed is:

1. A method of separating joined plastic and metal components in the form of aluminum closures with plastic liners therein comprising chilling the components to approximately −150° F to −250° F until the plastic becomes brittle, impacting the chilled components in a hammermill in which the hammers are spaced from the confining means a distance approximately equal to the extent of the closure skirt from its end wall to liberate the plastic from the metal without shredding the components and separating the chilled plastic components from the metal components.

2. A method as set forth in claim 1 in which the components are chilled with liquid nitrogen.

3. A method as set forth in claim 1 in which the components are isolated from ambient air to prevent condensation on the components.

4. Apparatus for separating plastic liners from aluminum closures in which the liners are trapped comprising:
a liquid nitrogen precooler for chilling aluminum closures with plastic liners therein to a range of approximately −150° F to −250° F to embrittle the plastic liners;
a hammermill in which the hammers are spaced from the confining means a distance approximately equal to the extent of the closure skirt from its end wall for impacting the chilled closures and liners to liberate the liners from the closures without shredding the liners or closures;
a tumble barrel for separating plastic liners and small pieces of closures from large pieces of closures;
a high tension electrical separator for separating small pieces of aluminum closures from plastic liners; and
means for isolating the aluminum closures and their liners from ambient air while chilling, impacting and separating the plastic from the aluminum.

* * * * *